US011778991B2

(12) United States Patent
James

(10) Patent No.: US 11,778,991 B2
(45) Date of Patent: *Oct. 10, 2023

(54) ESCAPE DETECTION AND MITIGATION FOR AQUACULTURE

(71) Applicant: X Development LLC, Mountain View, CA (US)

(72) Inventor: Barnaby John James, Campbell, CA (US)

(73) Assignee: X Development LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/939,144

(22) Filed: Sep. 7, 2022

(65) Prior Publication Data

US 2023/0000061 A1 Jan. 5, 2023

Related U.S. Application Data

(63) Continuation of application No. 17/102,947, filed on Nov. 24, 2020, now Pat. No. 11,516,997.

(51) Int. Cl.
*A01K 61/95* (2017.01)
*G06F 16/28* (2019.01)
(Continued)

(52) U.S. Cl.
CPC ............ *A01K 61/95* (2017.01); *G06F 16/285* (2019.01); *G06F 17/00* (2013.01);
(Continued)

(58) Field of Classification Search
None
See application file for complete search history.

(56) References Cited

U.S. PATENT DOCUMENTS 9,210,915 B2 * 12/2015 Künnen ................. A01K 61/95
10,856,520 B1 12/2020 Kozachenok et al.
(Continued)

FOREIGN PATENT DOCUMENTS

CL 2019000039 A1 3/2019
CN 108040948 5/2018
(Continued)

OTHER PUBLICATIONS

International Search Report and Written Opinion in International Appln. No. PCT/US2021/051704, dated Jan. 13, 2022, 50 pages.
(Continued)

*Primary Examiner* — Anand P Bhatnagar
(74) *Attorney, Agent, or Firm* — Fish & Richardson P.C.

(57) ABSTRACT

Methods, systems, and apparatus, including computer programs encoded on computer-storage media, for escape detection and mitigation for aquaculture. In some implementations, a method includes obtaining one or more images that depict one or more fish within a population of fish that are located within an enclosure; providing, to one or more detection models configured to classify fish that are depicted within the images as likely being member or as likely not being member of a type of fish, the one or images; generating, as a result of providing the one or more images to the one or more detection models, a value that reflects a quantity of fish that are depicted in the images that are likely a member of the type of fish; and detecting a condition based at least on the value.

20 Claims, 3 Drawing Sheets

(51) Int. Cl.
*G06F 17/00* (2019.01)
*G06V 10/00* (2022.01)

(52) U.S. Cl.
CPC ...... *G06T 2201/00* (2013.01); *G06T 2207/30* (2013.01); *G06V 10/00* (2022.01)

(56) References Cited

U.S. PATENT DOCUMENTS

| | | | |
|---|---|---|---|
| 11,532,153 B2* | 12/2022 | Kozachenok | G06V 20/52 |
| 2013/0223693 A1* | 8/2013 | Chamberlain | A01K 73/10 382/110 |
| 2013/0248425 A1* | 9/2013 | Kunnen | G01G 17/08 209/592 |
| 2017/0150701 A1 | 6/2017 | Gilmore et al. | |
| 2019/0228218 A1 | 7/2019 | Barnaby et al. | |
| 2019/0340440 A1 | 11/2019 | Atwater et al. | |
| 2019/0353765 A1* | 11/2019 | Sato | G06N 20/00 |
| 2020/0107524 A1 | 4/2020 | Messana et al. | |
| 2020/0155882 A1 | 5/2020 | Tohidi et al. | |
| 2020/0288678 A1 | 9/2020 | Howe et al. | |
| 2021/0142052 A1* | 5/2021 | James | G06N 20/00 |
| 2021/0289759 A1* | 9/2021 | Naval, Jr. | G06M 11/00 |
| 2021/0319550 A1* | 10/2021 | Thornton | A01K 63/003 |
| 2021/0329892 A1* | 10/2021 | Kozachenok | A01K 61/95 |
| 2021/0368747 A1* | 12/2021 | Chrobak | G06V 40/10 |
| 2022/0000079 A1* | 1/2022 | Chen | G06V 20/05 |
| 2022/0004760 A1* | 1/2022 | Kozachenok | A01K 61/80 |
| 2022/0071180 A1* | 3/2022 | Chrobak | G06T 7/70 |

FOREIGN PATENT DOCUMENTS

| | | |
|---|---|---|
| CN | 110335245 | 10/2019 |
| EP | 2244934 | 11/2010 |
| EP | 3484283 | 5/2019 |
| JP | 2002171853 | 6/2002 |
| KR | 20200067743 | 6/2020 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2012/081990 | 6/2012 |
| WO | WO 2014/179482 | 11/2014 |
| WO | WO 2017/137896 | 8/2017 |
| WO | WO 2018/011744 | 1/2018 |
| WO | WO 2018/011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Extended Search Report in European Appln. No. 22151132.2, dated May 2, 2022, 10 pages.
International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln. No. PCT/US2022/022492, dated Jun. 28, 2022, 13 page.
International Search Report and Written Opinion in International Appln. No. PCT/US2022/022589, dated Jul. 7, 2022, 12 pages.
International Search Report and Written Opinion in International Appln. No. PCT/US2022/022837, dated Aug. 2, 2022, 14 pages.
International Search Report and Written Opinion in International Appln. No. PCT/US2022/023831, dated Jul. 8, 2022, 13 pages.
International Search Report and Written Opinion in International Appln. No. PCT/US2020/059829, dated Feb. 25, 2021, 18 pages.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Odey, "AquaMesh—Design and Implementation, of Smart Wireless Mesh Sensor Networks for Aquaculture," American Journal of Networks and Communications, Jul. 2013, 8 pages.
Paspalakis et al., "Automated fish cage net inspection using image processing techniques," IET Image Processing, Aug. 2020, 14(10):2028-2034.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018, 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon *Salmo salar*," Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Varalakshmi et al., "Recognition Of Fish Categories Using Deep Learning Technique," 2019 3rd International Conference on Computing and Communications Technologies, Feb. 2019, pp. 168-172.
Wang, "Robust tracking of fish schools using CNN for head identification," Multimedia Tools and Applications, Nov. 2017, 20 pages.
www.namethatfish.com/ [online], "New generation of access control and mobile access control with NFC technology Assa Abloy," 2021, retrieved on Jun. 17, 2021, retrieved from URL<https://www.namethatfish.com/>, 4 pages.
Xiaoling et al., "Transfer learning and SE-ResNet152 networks-based for small-scale unbalanced fish species identification," Computers and Electronics in Agriculture, Nov. 2020, 180:105876.

\* cited by examiner

ESCAPE DETECTION AND MITIGATION FOR AQUACULTURE

CROSS-REFERENCE TO RELATED APPLICATION

This patent application is a continuation (and claims the benefit of priority under 35 USC 120) of U.S. patent application Ser. No. 17/102,947, filed Nov. 24, 2020. The disclosure of the prior application is considered part of (and is incorporated by reference in) the disclosure of this application.

FIELD

This specification generally relates to camera controllers, particularly those that are used for underwater cameras in aquaculture.

BACKGROUND

Researchers and fish farm operators face several challenges in managing pens or other enclosures used for aquaculture. While nets or other materials may be used to enclose fish within an aquaculture environment, these materials may tear or break while in use. In an open water environment, an undetected tear may result in the escape of fish, which may have negative consequences, e.g. on a nearby population of other fish.

When fish escape through a torn net of a pen, remediation efforts typically involve attempting to catch and return the escaped fish, such as by hiring sport fisherman or the use of Fjord nets. However, these methods tend to be both expensive and ineffective.

Manual, direct monitoring of an enclosure to determine if fish have escaped or are escaping can be difficult, as enclosures can be large (e.g., 170 meters to 200 meters in circumferences and 35 meters deep). Further, manual processes are often time-consuming, expensive, inaccurate, and can be delayed, such as when work schedules or adverse weather conditions decrease the availability of human monitors.

SUMMARY

In general, innovative aspects of the subject matter described in this specification relate to the escape detection and mitigation of fish.

According to one implementation of the subject matter described in this specification, tears in a meshed net enclosure that contains fish native to the enclosure may be detected to prevent the escape of the native fish or the introduction of foreign fish from outside of the enclosure. A surveillance device, e.g., a camera, is used to obtain images of fish that are present within the enclosure. The obtained images of present fish may include one or more native fish as well as one or more foreign fish that have entered the enclosure through a break in the meshed net. The obtained images are used to identify the species or type of fish corresponding to the present fish, and to calculate a metric, such as a ratio, which indicates an amount of native versus foreign fish within the enclosure, or a change in the amount of native versus foreign fish in the enclosure over time. The metric is utilized as an escape risk score, which can be used by other hardware control systems to initiate automated opening detection or mitigation procedures or techniques to locate, isolate, and/or remediate possible openings in the enclosure.

In some implementations, a method for escape detection and mitigation for aquaculture includes obtaining one or more images that depict one or more fish within a population of fish that are located within an enclosure; providing, to each of multiple detection models that are each configured to classify fish that are depicted within the images as likely being a member or as likely not being member of a different type of fish, the one or images; generating, as a result of providing the one or more images to the multiple detection models, a value that reflects a quantity of fish that are depicted in the images that are likely a member of each different type of fish; detecting an error condition relating to a possible opening of the enclosure based at least on the value; and in response to detecting the error condition relating to the possible opening of the enclosure, initiating one or more mitigation actions relating to the possible opening.

In some implementations, initiating the one or more mitigation actions includes sending a signal to a controllable device configured to move towards a location specified in the signal relative to the enclosure.

In some implementations, initiating the one or more mitigation actions includes sending signals to one or more devices configured to prevent fish entering and exiting the enclosure.

In some implementations, the multiple detection models include one or more classifiers configured to aid in classifying each of the one or more fish as likely being a member or as likely not being member of a different type of fish.

In some implementations, the method further includes storing locations corresponding to locations of the one or more fish enclosed within the enclosure.

In some implementations, initiating the one or more mitigation actions includes determining, based in part on the locations of the one or more fish, the possible opening of the enclosure that allows fish to exit or enter.

In some implementations, the method further includes sending an alert to a user based on user preferences, where the alert includes information used in initiating the one or more mitigation actions.

In some implementations, the multiple detection models include a machine learning model trained using images of the different type of fish.

Advantageous implementations can include one or more of the following features. For example, the indirect nature of population tracking allows effective detection of escapes and unintended enclosure openings without the effort of directly monitoring an enclosure for visual signs of tears or escapes. Given the typical size of enclosures, the direct method of monitoring the enclosure may require additional resources compared to the indirect method of population detection and tracking outlined in this specification. In addition, obtaining locations of one or more fish within the enclosure can be used to directly identify potential openings that allow foreign fish to enter the enclosure and native fish to exit the enclosure. Using these techniques, automated escape detection techniques can be initiated when the risk of an escape or unintended fish entry through an opening is high, and are avoided or eliminated when the risk of an escape is low, reducing unnecessary demand and wear-and-tear on surveillance devices, and preserving surveillance resources for other, higher priority surveillance tasks.

The details of one or more embodiments of the invention are set forth in the accompanying drawings and the descrip-

BRIEF DESCRIPTION OF THE DRAWINGS

Like reference numbers and designations in the various drawings indicate like elements.

DETAILED DESCRIPTION

Figure 1:
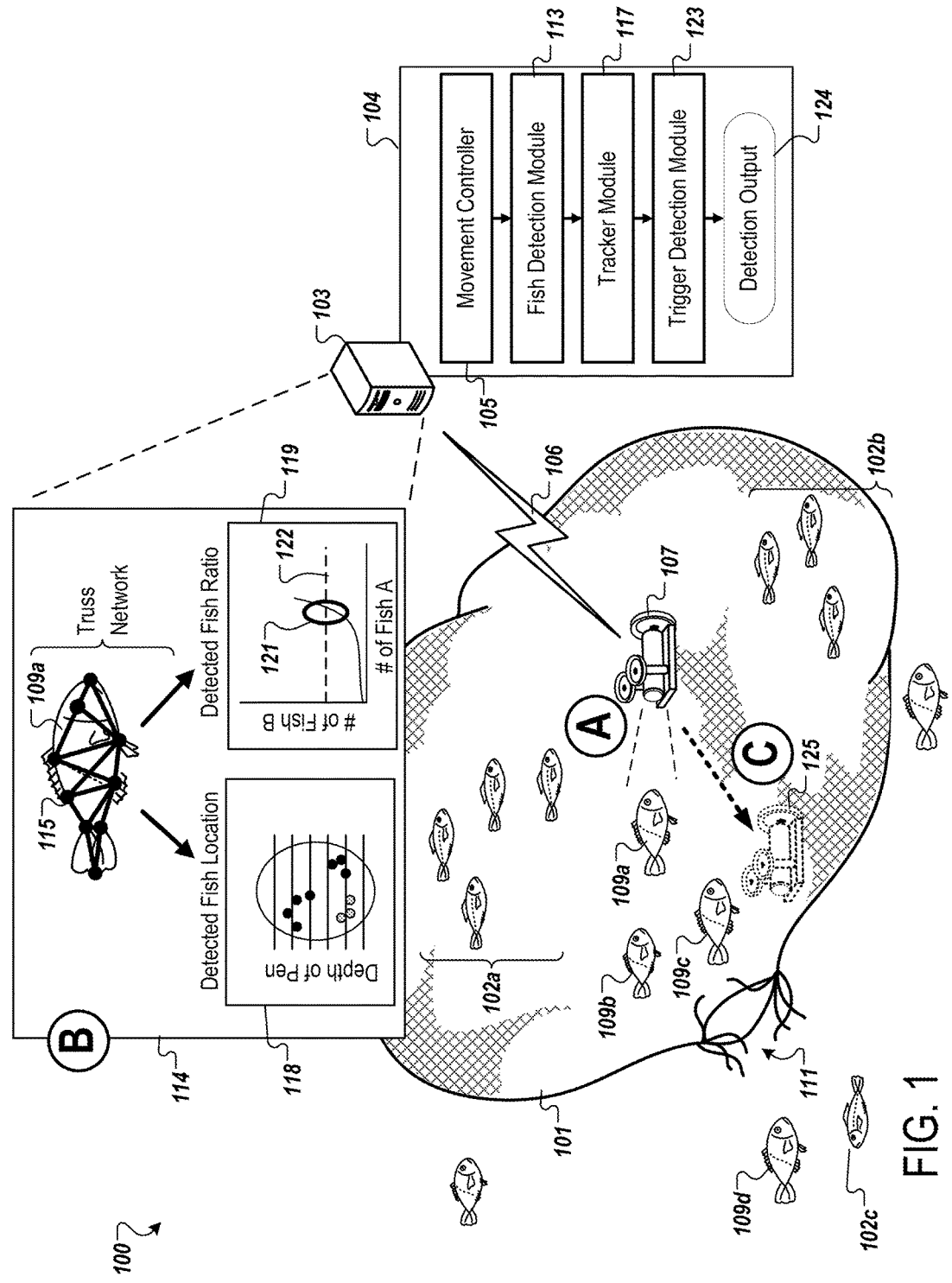
FIG. 1 is a diagram showing an example of an escape detection and mitigation system.

FIG. 1 is a diagram showing an example of an escape detection and mitigation system 100. The system 100 is configured to detect different types of fish within a fish net enclosure 101 and to track the populations of those different types of fish, e.g., different species such as salmon, mackerel, cleaner fish such as wrasse and lumpfish, among others. The system 100 is then configured to detect relative increases or other changes in the populations of the different types of fish, e.g., over time, as a proxy for escape detection. The system 100 is then configured to perform detection or mitigation actions that are designed to prevent native fish escaping from the enclosure 101 and to prevent foreign fish from entering the enclosure 101.

The system 100 includes the fish net enclosure 101 for the native fish shown in school 102a, school 102b, and fish 102c. Within this specification, native fish refer to fish that are initially enclosed within the enclosure 101 but may move out of the enclosure 101 through an opening such as opening 111 while foreign fish refer to fish that are initially not enclosed within the enclosure 101 but may move into the enclosure 101 through an opening such as the opening 111. The system also includes a control unit 103 that is communicably connected to a surveillance device 107. The control unit 103 is configured to send control signals to the surveillance device 107 as well as receive information from the surveillance device 107. The surveillance device 107 is configured to move and to record images of fish.

Stages A through C of FIG. 1 depict an example of the operation of the system 100. Specifically, in stage A, the surveillance device 107 patrols the enclosure 101. The surveillance device 107 receives one or more signals from the movement controller 104. The one or more signals can be used by the surveillance device 107 to inform movement around the enclosure 101.

In some implementations, the surveillance device 107 prioritizes escape detection in relation to one or more other tasks. For example, the surveillance device 107 can be used for multiple purposes such as fish identification, feeding tracking, behavior tracking, population identification, escape detection, general surveillance, among others. In some cases, the surveillance device 107 prioritizes actions related to escape detection when the risk of an escape caused by a tear, crack or other opening in the enclosure 101, is above a predetermined threshold. By prioritizing actions, the surveillance device 107 may perform escape mitigation or detection actions less frequently. By prioritizing actions, the surveillance device 107 may also conserve resources, such as energy, data storage or other limited resources. These resources may be saved for actions with greater priority. Similarly, by prioritizing actions, the surveillance device 107 can perform only high priority actions thereby potentially reducing wear and tear on physical mechanisms.

During patrol, the surveillance device 107 captures images of fish including one or more images of a foreign fish 109a. The foreign fish 109a is a fish with characteristics different from the native fish shown in schools 102a and 102b. The foreign fish or fishes 109a, 109b, and 109c enter the enclosure 101 through the opening 111 made in the enclosure 101. Similarly, the native fish 102c escapes through the opening 111. In the example of FIG. 1, the opening 111 is a tear in the fish net of the enclosure 101.

Although the detection and identification of the foreign fish 109a is considered in detail, the system 100 is similarly configured to detect and identify the native fish of schools 102a and 102b as well as other foreign fish 109b and 109c. The techniques used to detect and identify the foreign fish 109a, for example, can be used to detect and identify each of the fish of the native fish of schools 102a and 102b. In some implementations, a trained model uses alternative classifiers to detect or identify the foreign fish 109a and the native fish of schools 102a and 102b. For example, the trained model can use a classifier corresponding to native fish to detect or identify the native fish of schools 102a and 102b and can use a classifier corresponding to foreign fish to detect or identify the foreign fish 109a among other potential foreign fish such as foreign fish 109b and 109c.

The surveillance device 107 sends the captured one or more images of the foreign fish 109a to the control unit 103. In some cases, the surveillance device 107 also sends a location, e.g., depth, net grid, direction, position coordinates, radial position, enclosure identifier, quadrant or other sectional identifier, among others, corresponding to a present location of the foreign fish 109a. The captured one or more images of the foreign fish 109a may include visual portions that do not include the foreign fish 109a and visual portions that do include the foreign fish 109a. The control unit 109a can use any appropriate processing technique, such as a technique that uses image recognition to identify borders of the foreign fish 109a relative to a background or to detect predetermined markers on the body of the foreign fish 109a, e.g., nose of fish, tail of fish, or the like, in order to detect the foreign fish 109a within the captured one or more images. Any appropriate data processing technique known in the art may be used.

In stage B, the control unit 103 uses a fish detection module 113 to analyze the one or more images of the foreign fish 109a as shown in item 114. In the example of FIG. 1, the fish detection module 113 includes a truss network generator that generates a truss network 115 for the foreign fish 109a based on the captured one or more images of the foreign fish 109a. The truss network 115 can be used, in part, to determine the type of the foreign fish 109a. Depending on implementation, the type of the foreign fish 109a includes either a species identifier, a sub-species identifier, a distinctive element identifier, a health condition identifier, among others. The truss network 115 includes multiple values representing distances between various points on the body of the foreign fish 109a.

Based, at least, on the multiple values, the fish detection module 113 can determine a type of fish corresponding to the foreign fish 109a. For example, in situations where the native fish shown in schools 102a and 102b are salmon fish, the foreign fish 109a may be detected as a type of cleaner fish, Mackerel, or any other type of marine animal that is distinct from the native fish. The types of fishes that compose either the native fish shown in schools 102a and 102b or the foreign fish or fishes 109a, 109b, 109c, and 109d, is not limited in the present specification.

In some implementations, the fish detection module 113 uses one or more classifiers. For example, the fish detection module 113 can use a salmon model classifier to detect salmon, a mackerel model classifier to detect mackerel, a cleaner fish model classifier to detect cleaner fish, and so forth. In some cases, one or more classifiers are applied to one or more images in order to detect a given fish within the one or more images. In some cases, specific classifiers are updated based on one or more detections. In some cases, subcategories of salmon, mackerel, cleaner fish (e.g., wrasse, lumpfish), or other types of fish can be detected and classified using classifiers configured to detect the given subcategories.

In some implementations, detections of a first category or species of fish are not used to compute a value, such as a ratio, that reflects a quantity of fish that are depicted in one or more captured images. For example, the fish detection module 113 can use a salmon model classifier to detect salmon, a mackerel model classifier to detect mackerel, a cleaner fish model classifier to detect cleaner fish, and so forth. The system 100 may use only the detections of salmon and mackerel to trigger subsequent actions. The detections of one category of fish, e.g., cleaner fish, can be filtered from the data such that one or more other categories, e.g., salmon and mackerel, are used to generate a calculated value, e.g., a ratio.

In some implementations, the cleaner fish are included in a sum total of native fish. For example, in an example where salmon fish are native, the number of cleaner fish detections can be added to the number of salmon detections to create a sum of native fish detections. The sum of native fish detections can then be used to generate a ratio that includes the sum of native fish detections and the sum of foreign fish detections.

In some implementations, the fish detection module 113 uses classifiers that have been trained to identify different types of fish. For example, classifiers can be configured to detect subcategories of species or distinct species within a group of fish. The classifiers can be trained to detect different features, e.g., patterns, colors, truss lengths, distinctive elements, or the like, that are associated with a specific subcategory of a species or a specific species depending on implementation. After being trained to detect various features, the classifiers can be used to detect the various features in new obtained images. The detection of one or more features by a classifier that has been trained can then be used to identify a given fish as a member of a specific subcategory of species or a specific species.

Based on the detection of the fish detection module 113, a tracker module 117 generates a metric that records the current amount of the foreign fish 109a, e.g., as an isolated value or as a ratio of wild fish to farmed fish, and optionally any previous metrics associated with prior or subsequently determined metrics. In the example of FIG. 1, the tracker module 117 records a location of the foreign fish 109a based on the location, or other information, sent by the surveillance device 107 to the control unit 103.

The tracker module 117 adds the location of the foreign fish 109a to a stored map that includes one or more other stored locations of other fish. A visual representation of the stored map is shown in item 118 in which visual distinct elements denote fish of different categories. For example, native fish are illustrated as black dots in the visual representation of the stored map shown in item 118 and foreign fish are illustrated as grey dots in the visual representation of the stored map shown in item 118. In general, any visual representation may be presented to a user to show locations of one or more fish based on detections performed by the fish detection module 113. In some cases, the location of the foreign fish 109a includes a radial position or depth value.

The tracker module 117 increments a value of the metric corresponding to the cumulative number of foreign fish detected by the fish detection module 117 based on the detection of the foreign fish 109a as a foreign fish. This value is used to generate an escape risk score. A visualization of the running totals of foreign fish and native fish in the enclosure 101 is shown in item 119 in which the number of Fish Type B corresponds to the number of foreign fish (e.g., foreign fish 109a, 109b, and 109c) and the number of Fish Type A corresponds to the number of native fish (e.g., schools 102a and 102b).

At a point shown visually in item 121, the number of foreign fish increases relative to the number of native fish. In the example of FIG. 1, a trigger detection module 123 detects that the ratio of foreign fish to native fish has exceeded a threshold 122, i.e., the risk of an escape is detected to be high where an escape can include not only native fish escaping from the enclosure 101 but foreign fish entering the enclosure 101 through an opening such as the opening 111. The trigger detection module 123 generates detection output 124 based on corresponding information of the detection of the foreign fish 109a or any preceding or subsequent detections. For example, the detection output 124 can include a likely location of an opening such as a tear corresponding to the location of the opening 111. The location of the opening 111 can be informed by the location of one or more detected fish as shown in item 118.

In some implementations, the trigger detection module 123 detects an increase of the number of foreign fish within a predetermined amount of time. For example, the trigger detection module 123 can record an increase of foreign fish within an hour. If the trigger detection module 123 detects a sufficient number of foreign fish within the hour, the trigger detection module 123 can determine that there is likely a tear, hole, or other opening in the enclosure 101. If the trigger detection module 123 detects a sufficient number of foreign fish but it takes longer than an hour, the trigger detection module 123 can make an alternate determination. For example, in some cases, a slow rate of foreign fish detections can be caused by small fish swimming into the enclosure 101 and then growing over time.

In some implementations, a rate of foreign fish detections is used. For example, the tracker module 117 can record the number of foreign fish detections per a predetermined time period, e.g., second, minute, or the like. The number of foreign fish detections per the predetermined time period can be a rate of foreign fish detections. Based on the rate of foreign fish detections, the trigger detection module 123 can detect a sufficient increase in foreign fish that satisfies a threshold. For example, if the rate of foreign fish detections is above a certain threshold, the trigger detection module 123 can generate output that indicates a high likelihood that there is an opening and that subsequent actions, such as mitigation actions, should be performed. In some cases, satisfying a threshold includes determining a rate is above a threshold for a predetermined amount of time in order to prevent brief increases in detection rates that may be spurious from triggering subsequent actions.

The control unit 103, based on the detection output 124, sends information to the surveillance device 107. In some cases, the information is configured to instruct the surveillance device 107 to move to another location 125 that is near a likely tear or opening. The surveillance device 107 depicted at location 125 can then proceed in carrying out mitigation techniques or obtaining additional information concerning the opening 111. In some cases, mitigation techniques include repairs to the enclosure 101 or movements programmed to help prevent foreign fish from making their way into the enclosure 101 and to keep native fish from escaping.

In some implementations, automated escape detection techniques of the system 100 are initiated when the risk of an escape is high, and are avoided or eliminated when the risk of an escape is low. In this way, the system 100 can reduce unnecessary demand and wear-and-tear on surveillance devices such as the surveillance device 107, and preserve surveillance resources for other, higher priority surveillance tasks, such as tasks that have been prioritized above automated escape detection techniques based on a given risk score of a potential escape. The risk of an escape may represent a risk that native fish may be able to escape the enclosure 101 and foreign fish may be able to enter the enclosure 101.

In some implementations, the surveillance device 107 is outfitted with repair tools that enable the surveillance device 107 to repair the tear in the net of the enclosure 101 corresponding to the opening 111. For example, the surveillance device 107 can use fasteners to connect opposing sides of the opening 111 to prevent native fish escaping or foreign fish entering.

In some implementations, the enclosure 101 is a self-healing enclosure. For example, actuators can be embedded in the enclosure 101 and can then be controlled to close or open portions of the enclosure 101. When the location of an opening is detected based on the determinations of the control unit 103, signals can be sent to one or more actuators of the enclosure 101 within the vicinity of the suspected opening location with instructions to actuate or in other ways close any unintended opening. In some cases, subsequent data tracking by the control unit 103 can be used to determine if the actuators of the enclosure 101 were successful in closing the suspected opening location. If not, a search method that includes actuating other actuators in the vicinity of the initially activated actuators may be used until corresponding data tracking establishes that, based on determined values, the suspected opening location is closed.

In some implementations, the surveillance device 107 uses programed movements to help prevent foreign fish from making their way into the enclosure 101 and to keep native fish from escaping. For example, the surveillance device 107 can use sensors onboard, or information sent by the control unit 103, to locate the opening 111 and position itself such that the surveillance device 107 physically blocks the opening 111. In some cases, extendable fans or other tools available to the surveillance device 107 may be used to block the opening 111.

In some implementations, sounds or other deterrents are used to deter entering or exiting through the opening 111. For example, the surveillance device 107 may navigate within a vicinity of the opening 111 and use speaker devices to play audio designed to scare away one or more types of fish. The audio may resemble sounds of predators or may be loud or otherwise disturbing to a given fish. The audio may also be appealing and lure fish into a given location away from the opening 111.

In some implementations, attractors are used in response to an opening detection of the detection output 124 in order to control the locations of the fish in the enclosure 111. For example, food may be distributed within a predetermined location away from the opening 111 such that fish are attracted away from the opening 111. Any other attractive device known in the art may similarly be used.

In some implementations, dynamic blocking elements are used to prevent entering and exiting through the opening 111. For example, the surveillance device 107 can move to the location 125 and place a blocking element over the opening 111 in order to prevent or mitigate entering and exiting through the opening 111. In some cases, any device known in the art may be used, either onboard the surveillance device 107 or within the vicinity of the enclosure 101, to prevent entering and exiting through the opening 111. For example, the surveillance device 107 can use onboard water vents to create water currents in the vicinity of the opening 111. The water currents can be created to make entering and exiting through the opening 111 more difficult for fish. For example, water currents can be generated across the opening 111 such that a given fish attempting to enter or exit through the opening is impeded.

In some implementations, other robots or devices are used to carry out one or more actions attributed to one or more of the entities in the system 100. For example, instead of the surveillance device 107 navigating to the vicinity of the opening 111, a second or third robot can be alerted and can move towards the opening 111 to perform subsequent tasks. In some cases, the control unit 103, or another device communicably connected to the control unit 103, is used to send one or more signals to the second or third robot such that the second or third robot performs one or more actions relevant to the enclosure 101 or one or more fish in the vicinity of the enclosure 101.

In some implementations, the control unit 103 alerts one or more users based on alert preferences and the detection output 124. For example, the control unit 103 can send a message to a communicable connected device of a user with a notification detailing a likely tear in the net of the enclosure 101 as well as other information collected by the system 100. In general, any party may be informed of any given process performed or event detected by the system 100. The information sent to any given party may be presented according to one or more predetermined notification preferences that may be specific to the given party.

In some implementations, the surveillance device 107 can continue to send images to the control unit 103. The control unit 103 can monitor the ratio of foreign fish to native fish. Other thresholds may be used within mitigation techniques. For example, if the ratio of foreign fish to native fish has remained constant for a predetermined amount of time, the control unit 103 can alert the user that a given mitigation technique has been successful. In this case, both a predetermined amount of time and a predetermined rate of change can be used to determine if the ratio of foreign fish to native fish has remained constant for the predetermined amount of time.

In some implementations, the surveillance device 107 sends other information to the control unit 103. For example, the surveillance device 107 can send a current orientation to the control unit 103. The current orientation can include a current direction in which a camera affixed to the surveillance device 107 is pointing. The current orientation can incorporate an attitude of the surveillance device 107. The current orientation can also incorporate pitch, roll, yaw, or the like. In general, any method to locate and orient a device in three dimensional space can be used. Corresponding information for a given method to orient or locate the surveillance device 107 can be sent by the surveillance device 107 to the control unit 103.

In some implementations, the location is inferred based on other information sent by the surveillance device 107 to the control unit 103. For example, the fish detection module 113 can obtain a location of the surveillance device 107 at a current time corresponding to when the one or more images of the foreign fish 109a are captured by the surveillance device 107. Based on the location of the surveillance device 107 and the one or more images of the foreign fish 109a, a location of the foreign fish 109a may be inferred. In some cases, the truss network 115 is used to determine a likely distance between the foreign fish 109a and the surveillance device 107 at the time the one or more images of the foreign fish 109a are captured.

In some implementations, sequences of images are used to determine a direction of travel of the foreign fish 109a. For example, the control unit 103 can obtain a plurality of images of the foreign fish 109a. The control unit 103, using the fish detection module 113 can determine that the foreign fish 109a is heading in a current direction at a current rate of speed. Based on the determined current direction and current rate of speed, the fish detection module 113 can determine a subsequent location of the foreign fish 109a at some point after capturing the images.

In some implementations, the location is inferred based on orientation information sent by the surveillance device 107. For example, the surveillance device 107 can send a current orientation and location of the surveillance device 107 along with the one or more images of the foreign fish 109a to the fish detection module 113. The fish detection module 113 can use one or more of the orientation, location, and the one or more images of the foreign fish 109a to determine a location of the foreign fish 109a.

In some implementations, the native fish and foreign fish are the same species but do not share one or more characteristics. For example, the native fish may be a particular sub-species. The fish detection module 113 can detect a fish as belonging to the particular sub-species as a native fish and a fish not belonging to the particular sub-species as a foreign fish. The fish detection module 113 can make the classifications of foreign and native fish based on pre-stored data that describes one or more features that define a foreign fish and one or more features that define a native fish.

In some implementations, the non-shared characteristics between the native fish and foreign fish are generated externally by another process. For example, native fish can be tagged with distinctive elements such as visual elements (e.g., plastic markers, clipped fins, or the like) or non-visual elements (e.g., electronic chips, beacons, or the like). The surveillance device 107 can then patrol and obtain relevant data of distinctive elements (e.g., a image of a visual distinctive element or non-visual data of non-visual distinctive element) for a given fish such that the fish detection module 113 obtains data corresponding to the distinctive elements of the given fish and detects a type of the given fish based on the detected distinctive elements.

In some implementations, fish detected by the fish detection module 113 that do not correspond to any known fish type may be classified in a separate category such as unknown. For example, the fish detection module 113 can analyze data obtained by the surveillance device 107 and compare it with predetermined data for a given number of fish types. If the fish detection module 113 is unable to match the given obtained data to any predetermined fish type, the fish detection module 113 can mark the fish as unknown and tally the result accordingly to system settings. For example, an unknown fish may be included into an existing category such as a native fish or be included in a third category that is neither foreign fish nor native fish. In some cases, the third category can be used to generate a processing value used to determine whether or not a triggering event, such as an event shown in item 121 is detected by the trigger detection module 123.

In some implementations, instead of the threshold 122, another trigger is used by the system 100 to generate the detection output 124. For example, the tracker module 117 can track a level of change in a given fish category's population over a given amount of time. The trigger detection module 123, based on detecting a predetermined level of change can then generate the detection output 124 that includes information relevant to the level of change detected as well as potential areas of interest around the enclosure 101.

In some implementations, other processing values can be used as thresholds for the trigger detection module 123. For example, instead of a threshold 122 of Fish Type A to Fish Type B as shown in item 119, the trigger detection module 123 can compute one or more processing values based on one or more values representing a current or past number of native fish, a current or past number of foreign fish, a current or past number of a third category of sightings, or other relevant parameters. The resulting one or more processing values can then be used by the trigger detection module 123 to determine if a given event is taking place.

In some implementations, a type of machine learning model is used to detect whether or not an event occurred or whether or not to generate the detection output 124. For example, a given machine learning model used in the system 100 may be trained on historical data of fish escapes. The machine learning model can be trained to classify one or more given situations as corresponding to a given event. For example, a machine learning model can determine a potential fish escape based on historical data of fish escapes used as training data.

In some implementations, a type of machine learning model is used to detect where an event took place based on one or more recorded location items. For example, as shown in the visual representation of the stored map shown in item 118, the system 100 records a number of locations corresponding to given fish detections. Based on the positioning of one or more of the locations, a machine learning model, trained with historical positioning data, can be used to determine a likely opening, such as the opening 111 based on information corresponding to the stored map shown in item 118.

In some implementations, other processing techniques can be used by the fish detection module 113 in order to detect a fish. For example, instead of generating a truss network, the fish detection module 113 can obtain an electronic signal captured by the surveillance device 107 from a chip embedded in a fish such as a native fish of the school 102a. The fish detection module 113 can compare the electronic signal to known electronic signals of native fish and determine the type of fish based on the comparison.

In some implementations, other processing techniques can be used by the fish detection module 113 in order to detect or identify a fish within the captured one or more images. For example, instead of generating a truss network, the fish detection module 113 can use object detection or another form of image processing to detect a first visual portion of the obtained one or more images. The first visual portion may contain a distinctive visual element such as a tag, unique fin clipping, or other distinct element. The fish detection module 113 can identify, based at least in part on the first visual portion, the corresponding type of fish captured in the first visual portions of the obtained one or more images.

In some implementations, the control unit 103 is a device onboard the surveillance device 107. For example, the surveillance device 107 can be a submersible with one or more compartments or attachments devoted to the processing described with respect to the control unit 103. In some cases, one or more other surveillance devices can connect with the control unit 103 fixed onto the body of the surveillance device 107 such that the control unit 103 can process multiple signals for multiple surveillance devices.

Figure 2:
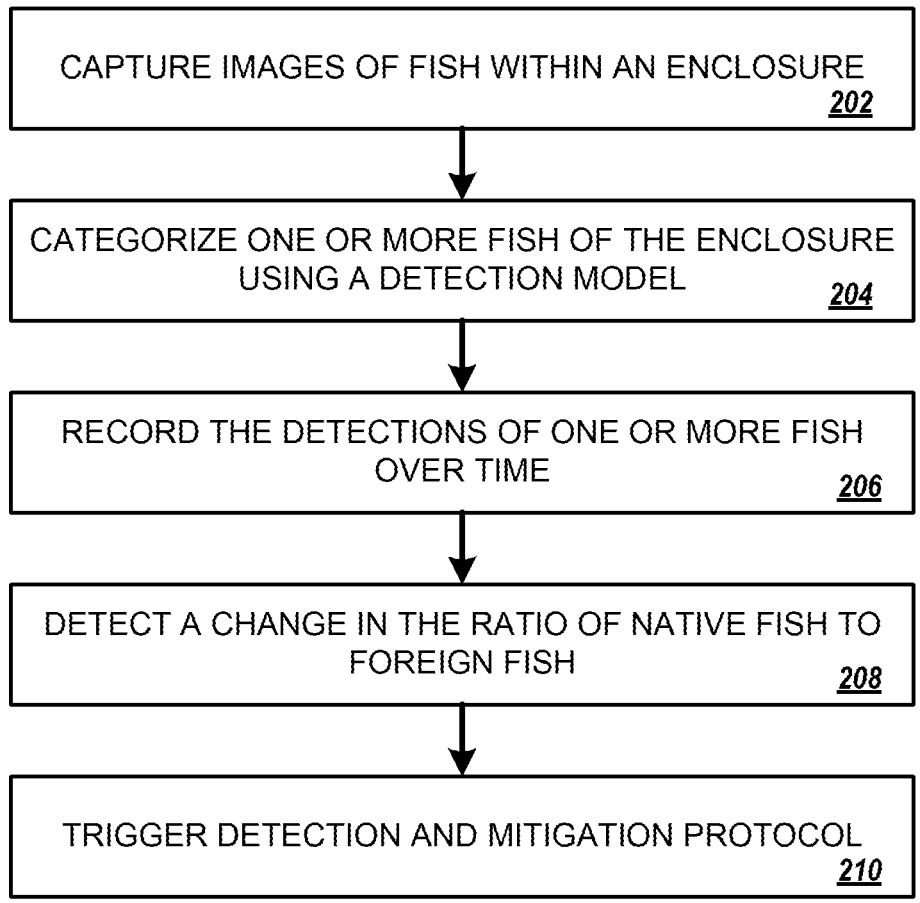
FIG. 2 is flow diagram illustrating an example of a process for escape detection and mitigation.

FIG. 2 is a flowchart illustrating an example of a process 200 for escape detection and mitigation. The process 200 may be performed by one or more electronic systems, for example, the system 100 of FIG. 1.

The process 200 includes capturing images of fish within an enclosure (202). For example, as shown FIG. 1, the surveillance device 107 patrols the enclosure 101. During patrol, the surveillance device 107 captures images of fish including one or more images of native fish in schools 102a or 102b. The surveillance device 107 similarly captures images of the foreign fish 109a. The foreign fish 109a is a fish with characteristics different from the native fish shown in schools 102a and 102b. The foreign fish or fishes 109a, 109b, and 109c enter the enclosure 101 through an opening 111 made in the enclosure 101. Similarly, the native fish 102c escapes through the opening 111.

The process 200 includes categorizing one or more fish of the enclosure using a detection model (204). For example, the surveillance device 107 sends information corresponding to the foreign fish 109a to the control unit 103. Based on the information, the control unit 103 and the fish detection module 113 categorize the foreign fish 109a as a foreign fish. The surveillance device 107 may also send information corresponding to one or more native fish of the schools 102a or 102b to the control unit 103. The information corresponding to the one or more native fish of the schools 102a or 102b can be used by the control unit 103 to detect and identify the one or more native fish of the schools 102a or 102b as native fish.

The process 200 includes recording the detections of one or more fish over time (206). For example, as shown in item 114, and items 118 and 119 of FIG. 1, the locations as well as a number of different types of fish are recorded. In the example of FIG. 1, the ratio of Fish Type A, native fish, to Fish Type B, foreign fish, is tracked by the tracker module 117 as shown in item 119. In addition, the locations of the various fish in the enclosure 101 is shown in item 118. Depending on implementation, other parameters or factors may be recorded.

The process 200 includes detecting a change in the ratio of native fish to foreign fish (208). For example, in FIG. 1, the trigger detection module 123 detects that the ratio of foreign fish to native fish has exceeded the threshold 122 as shown in item 114. As discussed above, in other implementations, other parameters corresponding to one or more fish detections in the enclosure 101 can be monitored.

The process 200 includes triggering detection and mitigation protocol (210). For example, the trigger detection module 123 can generate detection output 124 based on corresponding information of the detection of the foreign fish 109a or any preceding or subsequent detections. For example, the detection output 124 can include a likely location of a tear corresponding to the location of the opening 111. The location of the tear can be informed by the location of one or more detected fish as shown in item 118.

In some implementations, the control unit 103, based on the detection output 124, sends information to the surveillance device 107. In some cases, the information is configured to instruct the surveillance device 107 to move to the location 125 that is near a likely tear or opening. The surveillance device 107 depicted at location 125 can then proceed in carrying out mitigation techniques. In some cases, mitigation techniques include repairs to the enclosure 101 or movements programmed to help prevent foreign fish from making their way into the enclosure 101 and to keep native fish from escaping as discussed above.

Figure 3:
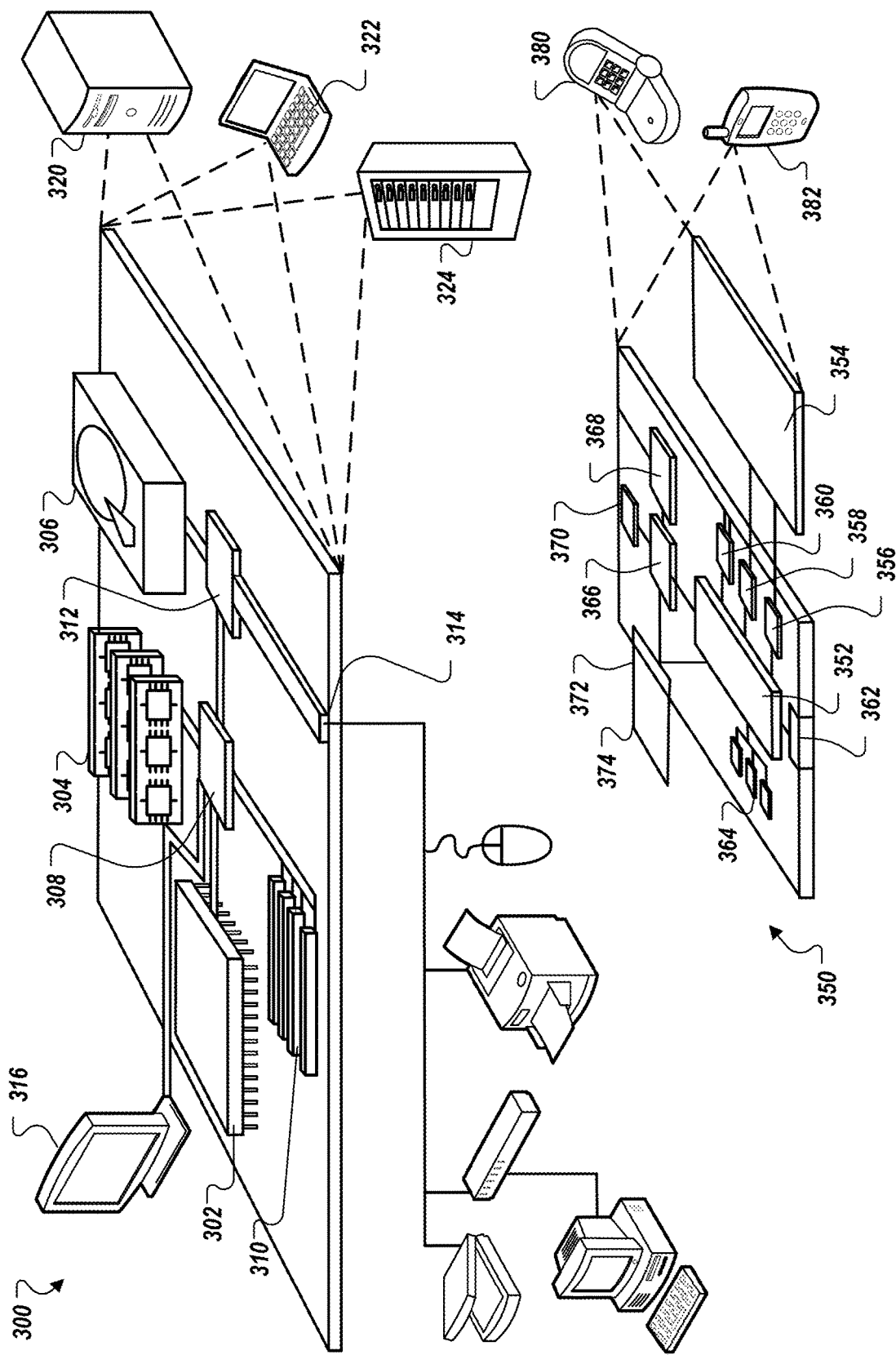
FIG. 3 is a diagram of computer system components that can be used in an escape detection and mitigation system.

FIG. 3 is a diagram of computer system 300 components that can be used to implement a system for escape detection and mitigation such as the system 100 of FIG. 1.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be examples only, and are not meant to limit implementations of the inventions described and/or claimed in this document.

Computing device 300 includes a processor 302, memory 304, a storage device 308, a high-speed interface 308 connecting to memory 304 and high-speed expansion ports 310, and a low speed interface 312 connecting to low speed bus 314 and storage device 308. Each of the components 302, 304, 308, 308, 310, and 312, are interconnected using various busses, and can be mounted on a common motherboard or in other manners as appropriate. The processor 302 can process instructions for execution within the computing device 300, including instructions stored in the memory 304 or on the storage device 308 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 308 is capable of providing mass storage for the computing device 300. In one implementation, the storage device 308 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 308, or memory on processor 302.

The high-speed controller 308 manages bandwidth-intensive operations for the computing device 300, while the low speed controller 312 manages lower bandwidth intensive operations. Such allocation of functions is only an example. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 308 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can also include secure information. Thus, for example, expansion memory 374 can be provided as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
   obtaining one or more images that depict one or more fish within a population of fish that are located within an enclosure;
   providing, to one or more detection models configured to classify fish that are depicted within the images as likely being member or as likely not being member of a type of fish, the one or images;
   generating, as a result of providing the one or more images to the one or more detection models, a value that reflects a quantity of fish that are depicted in the images that are likely a member of the type of fish; and
   detecting a possible opening of the enclosure based at least on the value.

2. The method of claim 1, comprising:
   determining a location of the quantity of fish within the enclosure.

3. The method of claim 2, comprising:
   obtaining location data from a device that captures the one or more images; and
   determining the location of the quantity of fish within the enclosure using the location data.

4. The method of claim 1, wherein detecting the possible opening of the enclosure based at least on the value comprises:
   detecting a condition based at least on the value.

5. The method of claim 1, wherein the value represents a ratio indicating a number of fish of the type of fish.

6. The method of claim 1, wherein the type of fish is a population raised for aquaculture in the enclosure.

7. The method of claim 1, comprising:
   sending a signal to a controllable device configured to move towards a location specified in the signal relative to the enclosure.

8. The method of claim 1, comprising:
   storing locations corresponding to locations of the one or more fish enclosed within the enclosure.

9. The method of claim 1, wherein the one or more detection models comprise a machine learning model trained using images of the type of fish.

10. A non-transitory, computer-readable medium storing one or more instructions executable by a computer system to perform operations comprising:
    obtaining one or more images that depict one or more fish within a population of fish that are located within an enclosure;
    providing, to one or more detection models configured to classify fish that are depicted within the images as likely being member or as likely not being member of a type of fish, the one or images;
    generating, as a result of providing the one or more images to the one or more detection models, a value that reflects a quantity of fish that are depicted in the images that are likely a member of the type of fish; and
    detecting a possible opening of the enclosure based at least on the value.

11. The medium of claim 10, wherein the operations comprise:
    determining a location of the quantity of fish within the enclosure.

12. The medium of claim 11, wherein the operations comprise:
    obtaining location data from a device that captures the one or more images; and
    determining the location of the quantity of fish within the enclosure using the location data.

13. The medium of claim 10, wherein detecting the possible opening of the enclosure based at least on the value comprises:
    detecting a condition based at least on the value.

14. The medium of claim 10, wherein the value represents a ratio indicating a number of fish of the type of fish.

15. The medium of claim 10, wherein the type of fish is a population raised for aquaculture in the enclosure.

16. The medium of claim 10, wherein the operations comprise:
    sending a signal to a controllable device configured to move towards a location specified in the signal relative to the enclosure.

17. The medium of claim 10, wherein the operations comprise:
    storing locations corresponding to locations of the one or more fish enclosed within the enclosure.

18. The medium of claim 10, wherein the one or more detection models comprise a machine learning model trained using images of the type of fish.

19. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    obtaining one or more images that depict one or more fish within a population of fish that are located within an enclosure;

providing, to one or more detection models configured to classify fish that are depicted within the images as likely being member or as likely not being member of a type of fish, the one or images;

generating, as a result of providing the one or more images to the one or more detection models, a value that reflects a quantity of fish that are depicted in the images that are likely a member of the type of fish; and detecting a possible opening of the enclosure based at least on the value.

20. The system of claim 19, wherein the operations comprise:

determining a location of the quantity of fish within the enclosure.

* * * * *